June 17, 1924.
G. MERZ
SHOCK ABSORBER
Filed Jan. 25, 1923
1,498,105
2 Sheets-Sheet 1
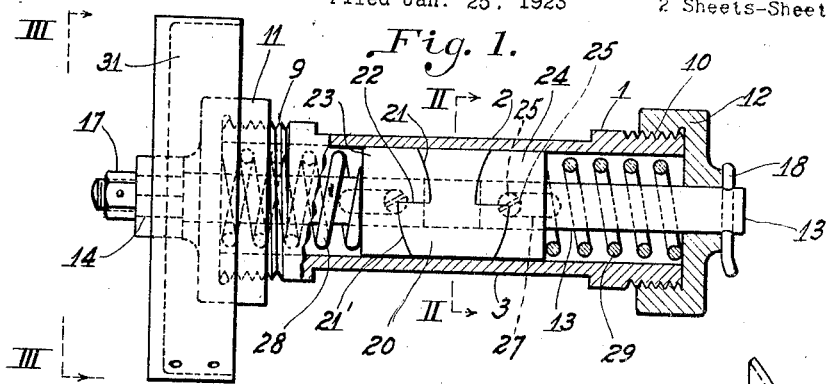
Fig. 1.
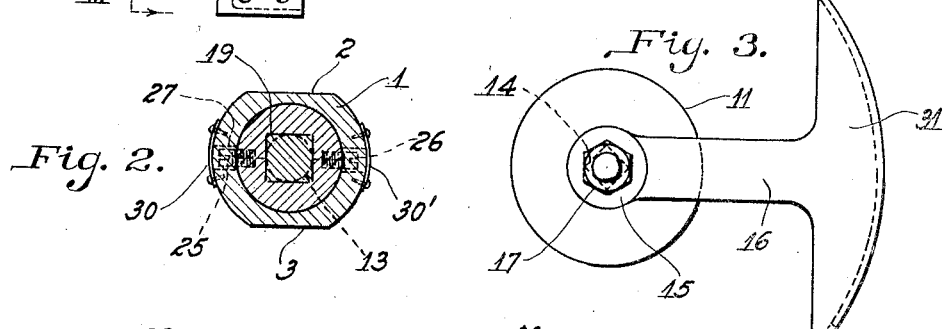
Fig. 2.    Fig. 3.
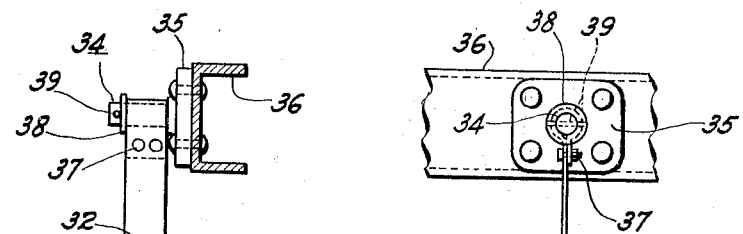
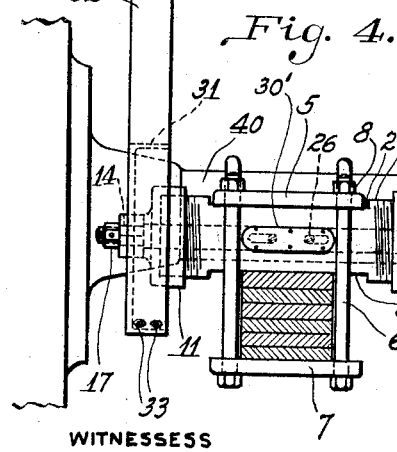
Fig. 4.
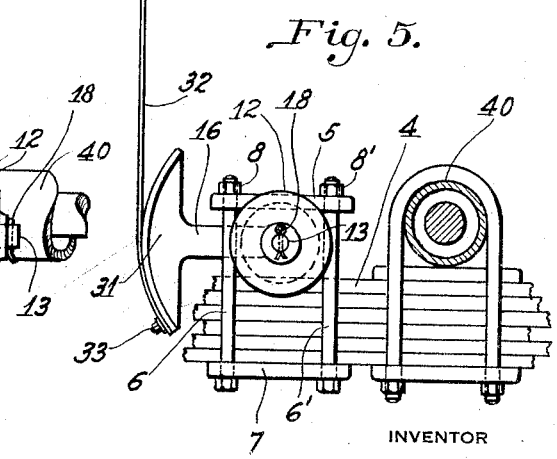
Fig. 5.
WITNESSES
CR Holbut
AB Wallace
INVENTOR
Gottlieb Merz
By Winter & Brown
his attys.

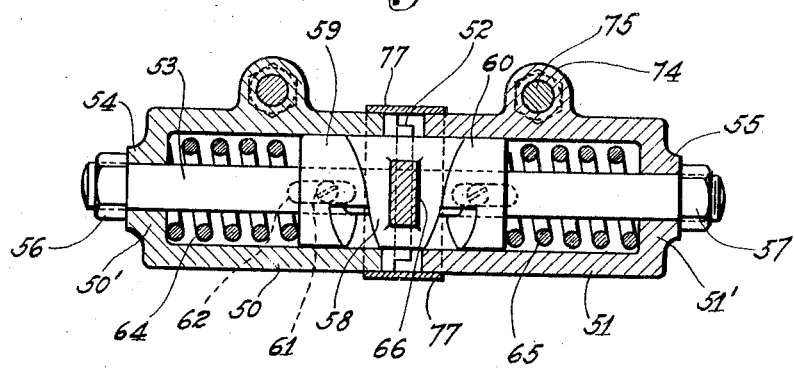
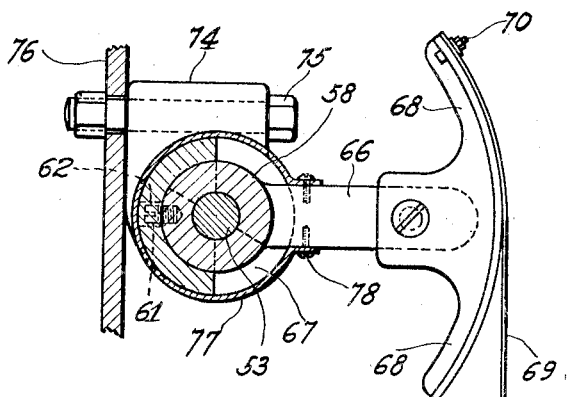
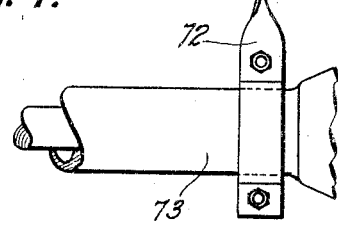

Patented June 17, 1924.

1,498,105

UNITED STATES PATENT OFFICE.

GOTTLIEB MERZ, OF McKEESPORT, PENNSYLVANIA.

SHOCK ABSORBER.

Application filed January 25, 1923. Serial No. 614,793.

*To all whom it may concern:*

Be it known that I, GOTTLIEB MERZ, a citizen of the United States, and a resident of McKeesport, in the county of Allegheny and State of Pennsylvania, have invented a new and useful Improvement in Shock Absorbers, of which the following is a specification.

This invention relates to shock absorbers for use in connection with vehicles, and is particularly intended to be employed on automobiles.

It is an object of the invention to provide a shock absorber which will remain inactive while the springs are being compressed, but which will during the expansion of the springs cushion and limit the upward movement upon the rebound of the body of the vehicle.

It is also an object to provide a shock absorber which is simple in construction, strong and durable, which will not easily get out of order, which can be readily applied to vehicles already in use or furnished as a regular part of the initial equipment thereof, which can be manufactured at a nominal cost, and which will operate efficiently to obtain the desired cushioning effect.

It is a special object to provide a device which will contain comparatively few parts, which can be readily assembled and disassembled, in which all of the working parts are efficiently housed, in which the strains will be distributed substantially equally and in opposite directions upon the compression of the tension devices employed, which in conjunction with the symmetrical formation and disposition of the parts minimizes unbalanced forces, consequently prolonging the life of the device.

These and other objects of the invention will more fully appear when taken in conjunction with the following description and the appended claims.

In the drawings, Fig. 1 is a view partly in section and partly in elevation showing one embodiment of the invention; Fig. 2 a transverse sectional view taken on the line II—II, of Fig. 1, illustrating the method of mounting the central cam block, and the means preventing rotary movement of the slidable abutting blocks; Fig. 3 an end elevation looking in the direction of the arrows III—III of Fig. 1; Fig. 4 a side elevation, with parts in section, showing one method of mounting the device in operative position; Fig. 5 an end elevation of the parts illustrated in Fig. 4; Fig. 6 a longitudinal sectional view, with parts in elevation, illustrating a modified form of the invention, and Fig. 7 a transverse sectional view taken through the device illustrated in Fig. 6.

In the embodiment illustrated in Figs. 1 to 5, the main casing or barrel of the device is designated by the reference numeral 1, its upper and lower sides being flattened upon the exterior as shown at 2 and 3, respectively. The casing is flattened in order to facilitate its mounting upon the vehicle, the face 3 being adapted to contact and rest upon the upper surface of the lower spring section 4 while the face 2 cooperates with a superposed plate 5, when mounted in the manner shown in the drawings. The plate 5 is bound into firm contact with the casing and all of the parts are rigidly held in position by means of pairs of compression bolts 6, 6′ which project through suitably formed apertures in a plate 7 disposed at the lower side of the spring section 4, the upper ends of these bolts extending through openings in the plate 5, and are equipped with nuts as shown at 8, 8′.

The opposite extremities of the casing are exteriorly threaded at 9 and 10, an end cap 11 cooperating with the former, and a similar end cap 12 with the last named threads. The casing is elongated and is provided with an internal cylindrical bore extending the full length thereof, and extending from end to end of the casing is an axial guide rod 13, which in the embodiment illustrated in Figs. 1 to 5, projects beyond the ends of the casing and is journalled for rotation in bosses formed upon the end caps 11 and 12. The end of the guide rod 13 adjacent the end cap 11 is formed with a non-circular reduced portion 14, which is adapted to cooperate with a correspondingly shaped aperture formed in the boss 15 at the inner extremity of a crank arm 16, the crank arm being fixed to the guide rod by means of the nut 17. Relative longitudinal movement between the guide rod and the casing is prevented in any suitable way preferably by forming an aperture through the portion which projects beyond the end cap 12 and fitting this aperture with a cotter pin 18.

The guide rod 13 at a point substantially midway of its length, and corresponding to the central portion of the casing 1, is provided with a squared portion 19 on which is freely mounted a cam block 20 equipped at its opposite sides with inclined cam faces. Each side of the cam block is provided with a plurality of inclined cam faces 21, 21', connected by the intermediate shoulder 22, the opposite sides of the cam block being similarly formed. The internal bore of the casing is cylindrical, and the cross section of the cam block corresponds to that of the casing so that upon assembly of the parts the internal surface of the casing functions as a bearing for the periphery of the cam block. Mounted at opposite sides of the cam block 20 are longitudinally slidable blocks 23 and 24, the faces of these slidable blocks adjacent the cam block corresponding in shape with those of the cam block so as to contact the same throughout substantially their entire extent when forced into intimate contact therewith, the portion joining the inclined faces thereof being adapted to contact the shoulder 22. These blocks are provided with central apertures through which the guide rod 13 projects, and are rendered non-rotatable by means of lugs 25, 26, in the form of stud bolts, the heads of which project into and are guided by elongated slots 27 provided in the wall of the casing 1. A coiled compression spring 28 is interposed between the block 23 and the end cap 11, a corresponding spring 29 being interposed between the block 24 and the end cap 12. In order to exclude the entry of dust, suitable plates 30, 30' are provided for covering the guiding slots 27.

The outer extremity of the arm 16 is provided with a segmental flanged head 31 to which is attached one end of a flexible strap 32 as at 33, the opposite end of the belt being attached to an anchoring stud 34 formed on a plate 35 adapted to be attached to the body or frame 36 of the vehicle, the strap being preferably attached by looping the extremity thereof around the stud and bolting as at 37. This looped end is prevented from slipping off the stud 34 by means of a washer 38 and cotter pin 39.

From the above description, it is clearly seen that the central cam block 20 is not only mounted for rotation within the interior of the casing 1, but is free to adjust itself longitudinally of the casing so as to equalize the tension of the springs 28 and 29. All of the cam faces are similarly formed and the several parts are symmetrically arranged with respect to the cam block, so that all strains incident to the compression of the springs during use are substantially equally balanced.

Although the casing 1 has been illustrated and described as mounted upon the lower spring section 4, and preferably in close proximity to the axle housing 40, the points of attaching the casing 1 and the looped end of the strap can be reversed, that is, the casing fixed to the body or frame 36 and the end of the strap to the spring section 4 adjacent the axle housing or directly to the housing itself. In fact, the particular parts of the vehicle to which either the casing or looped end is fixed are not vital provided that the relative movements between the points of anchorage results in a pull upon the strap 32 to rotate the arm 16 in the proper direction to place the springs 28 and 29 under tension during the rise of the vehicle body under the rebound of its supporting springs. The showing in the drawing is therefore merely illustrative of one method of mounting.

In operation, the blocks 23, 24, are normally urged towards the central portion of the casing under the influence of the coiled compression springs 28, 29, and occupy the positions shown in Fig. 1, in which the abutment of the shoulder 22 with the cooperating shoulders on the slidable blocks prevents rotary movement of the cam block 20, holding the arm 16 in the position shown in Fig. 5. During the depression of the body-supporting springs of the vehicle, the frame 36 approaches the point of support of the shock absorber permitting the flexible strap 32 to slacken or fold upon itself, and consequently does not effect the normal position of the arm 16. However, upon the rebound of the supporting springs of the vehicle causing the body to move upwardly, the flexible strap 32 is tightened until it reaches a point where all slack therein is removed. Subsequent upward movement of the body then causes the arm 16 to be raised rotating the guide rod 13 and the cam block 20. Rotation of the cam block causes a spreading apart of the longitudinally slidable blocks 23 and 24 at the opposite sides thereof placing the compression springs 28 and 29 under tension, with the effect of hindering or cushioning further rise of the vehicle body, in a well known manner.

Although the device described may be mounted upon the spring at a point adjacent the axle housing, upon the axle housing itself or directly upon the body or frame of the vehicle, as previously described, due to the lack of space and the relative disposition of the parts upon various makes of automobiles, it has been found that actuation of the central cam block by means of an arm 16 located adjacent the end of the casing is under certain conditions somewhat inconvenient, it being more desirable to dispose the actuating arm for the central cam block intermediate the ends of the casing. A modified form of the invention in which the actuating arm for the central cam block is so located is illustrated in Figs. 6 and 7.

In the modified form of the invention, the casing consists of two cup-shaped sections 50, 51, having the closed ends 50' and 51', respectively. The open ends of these sections are cut away as illustrated at 52 so as to telescope one with the other and form a continuous construction. The recesses within the sections register when the same are in assembled relation so as to provide a cylindrical bore extending from end to end of the entire casing. The two sections are bound together by means of a stationary compression bolt 53 extending through suitably formed apertured bosses 54, 55, the projecting ends of the bolt being equipped with the nuts 56, 57. The bolt 53 is cylindrical throughout its entire length, and has mounted thereupon midway of its length the central cam block 58 provided with inclined cam faces and intervening shoulders similar to those employed in connection with the first described embodiment. Longitudinally slidable blocks 59 and 60, which are prevented from rotating by means of the stud bolts 61 projecting within the elongated apertures 62 are disposed at opposite sides of the central cam block 58, and compression springs 64 and 65 are interposed between the slidable blocks and the ends of the casing as in the previously described form. The bolt 53 extends axially of the casing and serves in addition to its binding the sections of the casing together, as a guide rod for the cam block, the blocks 59 and 60 and the compression springs.

The central cam block 58 is provided with a radially extending crank arm 66 which is adapted to project outwardly through a suitably formed slot 67 located between the sections of the casing. The outer extremity of the arm 66 carries a segmental arcuate head 68 to which one end of the flexible strap 69 is attached as at 70, the opposite end of which is attached at 71 to a suitable clamp collar 72 embracing the axle housing or other part 73.

Each of the sections of the casing is provided with a boss 74 at one side thereof for the reception of the bolt 75 which serves to anchor the casing upon the frame or body 76. In order to cover the joint between the sections of the casing for the purpose of excluding dust, a band 77 is attached to the arm 66 as at 78 and encircles the casing at its central portion, as clearly shown in Figs. 6 and 7.

This modified form has been illustrated with the casing attached to the body or frame of the vehicle, and the extremity of the flexible strap 69 anchored to the axle housing, but it is obvious that the points of support of the casing and the free end of the strap may be reversed, or the two may be affixed at any desirable points adapted to permit the proper functioning of the device, it being merely essential that the flexible strap 69 be put under tension to rotate the arm 66 to compress the springs 64 and 65 during the upward rebound of the body of the vehicle.

It is thus seen that the invention provides a simple, compact and durable construction, containing comparatively few parts, one which will not easily get out of order, one which may be readily placed upon vehicles already in use, one in which the central cam block is freely mounted so as to adjust itself longitudinally to a position in which the pressures upon the tension devices will be equalized, and one in which the several parts are symmetrically formed and disposed whereby to equally distribute the strains incident to its use during the operation thereof.

I claim:

1. A shock absorber comprising a casing, a floating cam block capable of bodily longitudinal movement and adapted to rotate within the casing, non-rotatable slidable blocks abutting opposite sides of the said cam block, compression springs interposed between the outer end of each of said blocks and the adjacent end of the casing, and means for rotating said cam block whereby rotation thereof will move the slidable blocks and compress both of said springs.

2. A shock absorber comprising an elongated casing, a cam block capable of both longitudinal and rotatable movement mounted centrally of said casing and provided with similar cam faces at its opposite sides, a non-rotatable slidable block abutting each of said cam faces, a compression spring interposed between the outer end of each of said blocks and the ends of the casing, and means for rotating the said cam blocks whereby to separate the slidable blocks and compress the said springs substantially equal amounts.

3. A shock absorber comprising a casing formed with a cylindrical bore and elongated openings at each side of a point midway between its ends, a central cam block rotatably mounted in the casing, slidable blocks abutting the cam block upon opposite sides thereof, a removable lug fixed to each of said slidable blocks and projecting within the said elongated openings, compression springs interposed between the outer end of each of said slidable blocks and the adjacent end of the casing, and means to rotate the cam block to compress the said springs.

4. A shock absorber comprising a casing provided with an elongated bore, an axial guide rod extending from end to end of the casing, a rotatable cam block mounted centrally of the casing, non-rotatable slidable blocks abutting the opposite faces of the cam block, said slidable blocks being mounted for longitudinal movement upon said guide rod, a compression spring surrounding the said rod and interposed between each of said slidable blocks in the adjacent end of the casing, and means for rotating the said cam block whereby to compress the said springs.

In testimony whereof, I sign my name.

GOTTLIEB MERZ.

Witness:
EDWIN O. JOHNS.